US011853806B2

(12) United States Patent
Williams et al.

(10) Patent No.: US 11,853,806 B2
(45) Date of Patent: Dec. 26, 2023

(54) CLOUD COMPUTING PLATFORM THAT EXECUTES THIRD-PARTY CODE IN A DISTRIBUTED CLOUD COMPUTING NETWORK AND USES A DISTRIBUTED DATA STORE

(71) Applicant: CLOUDFLARE, INC., San Francisco, CA (US)

(72) Inventors: Ashley Williams, Austin, TX (US); Joaquin Madruga, Austin, TX (US); Ashley Lewis, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 17/035,193

(22) Filed: Sep. 28, 2020

(65) Prior Publication Data
US 2021/0096926 A1    Apr. 1, 2021

Related U.S. Application Data

(60) Provisional application No. 62/907,462, filed on Sep. 27, 2019.

(51) Int. Cl.
*G06F 9/50* (2006.01)
*G06F 8/41* (2018.01)
*G06F 21/57* (2013.01)
*G06F 21/53* (2013.01)

(52) U.S. Cl.
CPC ............ *G06F 9/5072* (2013.01); *G06F 8/433* (2013.01); *G06F 21/53* (2013.01); *G06F 21/57* (2013.01)

(58) Field of Classification Search
CPC ........ G06F 9/5072; G06F 8/433; G06F 21/53; G06F 21/57; G06F 9/4484; G06F 21/6218; G06F 9/44521; H04L 67/02; H04L 67/20; H04L 67/34; H04L 67/2842
See application file for complete search history.

(56) References Cited

U.S. PATENT DOCUMENTS

| 7,287,227 | B2 | 10/2007 | Ries et al. |
| 8,069,266 | B2 | 11/2011 | Schwimer |
| 8,112,471 | B2 | 2/2012 | Wei et al. |
| 8,171,161 | B2 | 5/2012 | Schwimer |
| 9,588,854 | B2 | 3/2017 | Adler |

(Continued)

OTHER PUBLICATIONS

McLaughlin, Tom. "Static Websites on AWS S3 With Serverless Framework." Serverlessops, Feb. 13, 2018, "https://www.serverlessops.io/blog/static-websites-on-aws-s3-with-serverless-framework", last accessed Mar. 3, 2023, 9 pages.

(Continued)

*Primary Examiner* — Michael A Keller
(74) *Attorney, Agent, or Firm* — NICHOLSON DE VOS WEBSTER & ELLIOTT LLP (57) ABSTRACT

A compute server receives a request from a client device that triggers execution of a third-party code piece. The compute server is one of multiple compute servers that are part of a distributed cloud computing network. The third-party code piece is executed at the compute server and causes a value to be read from a distributed key-value store and/or written to the distributed key-value store. A response is generated to the request based at least in part on the executed third-party code piece, and the generated response is transmitted to the client device.

18 Claims, 5 Drawing Sheets

(56) References Cited

U.S. PATENT DOCUMENTS

| | | |
|---|---|---|
| 9,842,174 B2 | 12/2017 | Levy et al. |
| 10,015,226 B2 | 7/2018 | Scoda et al. |
| 10,218,633 B2 | 2/2019 | Carl |
| 10,235,471 B2 | 3/2019 | Rajkumar et al. |
| 10,331,462 B1 | 6/2019 | Varda et al. |
| 10,866,943 B1* | 12/2020 | Wright ................ G06F 16/9038 |
| 11,048,859 B2 | 6/2021 | Price et al. |
| 2014/0047341 A1* | 2/2014 | Breternitz ................ G06F 16/23 |
| | | 715/735 |
| 2017/0034266 A1 | 2/2017 | Lopez, Jr. |
| 2019/0028531 A1 | 1/2019 | Nagar et al. |
| 2019/0102206 A1* | 4/2019 | Fichtenholtz ......... G06F 9/5005 |
| 2020/0012569 A1* | 1/2020 | Natanzon ............ G06F 16/2219 |
| 2020/0125611 A1 | 4/2020 | Kadlabalu et al. |
| 2020/0193017 A1* | 6/2020 | Bannister .............. G06F 21/556 |

OTHER PUBLICATIONS

Pinkerton, Stephen; Bloom, Zack. "Building With Workers KV, a Fast Distributed Key-Value Store." Cloudflare Blog, Sep. 28, 2018, "https://blog.cloudflare.com/building-with-workers-kv/", last accessed Mar. 10, 2023, 11 pages.

Partovi, Ashcon, "Workers KV—Cloudflare's distributed database", The Cloudflare Blog, May 21, 2019, downloaded at https://blog.cloudflare.com/workers-kv-is-ga/, 15 pages.

Freeman, Kristian, "Building a To-Do List with Workers and KV", The Cloudflare Blog, May 21, 2019, downloaded at https://blog.cloudflare.com/building-a-to-do-list-with-workers-and-kv/, 28 pages.

* cited by examiner

ISOLATED EXECUTION
ENVRIONMENT MODEL

FIG. 4

VIRTUAL MACHINE
MODEL

CLOUD COMPUTING PLATFORM THAT EXECUTES THIRD-PARTY CODE IN A DISTRIBUTED CLOUD COMPUTING NETWORK AND USES A DISTRIBUTED DATA STORE

CROSS-REFERENCE TO RELATED APPLICATIONS

This application claims the benefit of U.S. Provisional Application No. 62/907,462, filed Sep. 27, 2019, which is hereby incorporated by reference.

FIELD

Embodiments of the invention relate to the field of network computing; and more specifically, to a cloud computing platform that executes third-party code in a distributed cloud computing network and uses a distributed data store.

BACKGROUND

Historically, web application code has been split between origin servers and browsers that are connected by a network that transmits data from point to point. Many large websites were first run on large physical mainframe servers that could handle large traffic and large data. Over time a switch was made to run websites on tens to hundreds of commodity servers that allowed for a reduction in cost, more fault tolerance, and increased performance. The next switch was using virtual machines where one physical machine could be split into multiple virtual machines that can be independently managed. However, virtual machines typically have a high cost. For instance, each virtual machine is typically allocated hundreds of megabytes of RAM and typically takes tens of seconds to boot. Containers can be used to further provide isolation and are less resource intensive than virtual machines. But web application code running in a container typically is run in its own OS-level process, consuming RAM and inducing context-switching overhead. Also, while native code can load quickly in a container, many server-oriented language environments are not optimized for startup time.

Some cloud computing platform process spin up a containerized process for your code and auto-scales the process which creates cold-starts. A cold-start occurs when a new copy of the code starts on a machine. A new containerized process is begun which can take between hundreds of milliseconds to multiple seconds (e.g., between 500 ms to 10 seconds). This means that any request may be hanging for as much time as it takes to begin the new containerized process (e.g., as much as ten seconds). Also, this containerized process can only process a single request at a time and a new containerized process must be cold-started each time an additional concurrent request is received. This means that a laggy request can happen over and over. Also, if the containerized process does not receive a request to process within a certain amount of time, it will automatically shut down and will need to be cold-started again once the request is received. When new code is deployed, this entire process proceeds again as each containerized process needs to be spun up anew.

One of the key features of an operating system is the ability to run many processes at once. The operating system transparently switches between the various processes that want to run code at any given time. The operating system accomplishes this through a context switch that moves the memory required for one process out and the memory required for the next process in. A context switch can take as much as 100 microseconds. When multiplied by all the processes running on the average cloud computing platform server creates a heavy overhead. This means that not all the CPU's power can be devoted to actually executing the customer code, but rather some is spent switching between the processes.

Most computing platforms are meant to be run by individual customers on their own servers. They are not intended to be run in a multi-tenant environment, executing code of other customers. Memory is often the highest cost of running a customer's code (even higher than the CPU cost).

Building and maintaining applications that easily scale to support spikes in demand or a global user base has generally required a large amount of both upfront engineering work and ongoing operational support. Developers are forced to spend significant time on writing supporting code rather than building the application itself. Many cloud computing platforms require the developer to specify where the code should run (e.g., at which nodes of the cloud computing platform), often with a small number of nodes that can be selected.

Conventional static site solutions use a site's HTML as an entry point to the static site generator's asset manifest. This causes problems in caching HTML because it is difficult or impossible to bust the cache because there is no other entry point to manage the asset fingerprints other than the HTML itself.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus for a cloud computing platform that executes third-party code and provides a distributed data store (e.g., key value store) in a distributed cloud computing network is described. The distributed cloud computing network includes multiple servers that are geographically distributed such as in different locations throughout the world and execute the third-party code and/or provide the distributed data store. These servers are referred herein as compute servers and may exist towards the edge of the network.

There may be hundreds of these compute servers that are geographically distributed in different points-of-presences (PoPs). Each PoP may include one or more physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP may be part of a different data center and/or colocation site. The distributed cloud computing network may provide different services for customers (e.g., internet application owner or operator, domain owner or operator) such as protecting against internet-based threats, performance services (e.g., acting as a content delivery network (CDN) and dynamically caching customer's files closer to visitors, page acceleration/optimization), TCP stack optimizations, and/or other services.

Third-party code (e.g., written by or deployed by third parties such as customers) can be deployed to all or some of the compute servers of the distributed cloud computing network. The third-party code can be, for example, a piece of JavaScript or other dynamically-typed language, a WebAssembly (WASM) compiled piece of code, or other compiled code. In an embodiment, the third-party code is compliant with the W3C standard ServiceWorker API. The third-party code can, for example, intercept and answer HTTP requests and make outgoing HTTP subrequests as part of answering an HTTP request, modify responses, and/or generate new responses without communicating with an origin server. The third-party code is typically executed in a runtime at the compute servers and is not part of a webpage or other site asset of the third-party. For purposes of this description, each piece of third-party code is referred to as a worker script and an executed instance of the worker script is referred to as a worker.

The third-party code has access to the distributed data store. The distributed data store may include a key-value store that is available at each of the PoPs (e.g., at one or more of the compute servers in each PoP). The key-value store may be eventually-consistent. Since the distributed data store is geographically distributed and therefore typically physically closer to clients, the data can be read and written with lower latency than conventional storage. The combination of the third-party code and the distributed data store can allow entire applications or websites to be built with the performance traditionally associated with static content cached by a content delivery network (CDN). For instance, the applications can include: mass redirects (e.g., handling billions of HTTP redirects); user authentication (e.g., validating user requests); translation keys (e.g., dynamically localizing web pages); configuration data (e.g., managing who can access the data); step functions (e.g., synchronize state data between multiple APIs functions); and edge file store (e.g., host large amounts of files). Further, the combination of the third-party code and the distributed data store can allow entire applications or websites to run entirely on the distributed cloud computing network without an origin server.

In an embodiment, a worker script of a particular third-party is run in an execution environment in which a single process can safely run third-party code. The process can contain multiple execution environments at the same time and the process can seamlessly switch between them. Code in one execution environment cannot interfere with code running in a different execution environment despite being in the same process. The execution environments are managed in user-space rather than by an operating system. Each execution environment uses its own mechanism to ensure safe memory access, such as preventing the code from requesting access to arbitrary memory (restricting its use to the objects it has been given) and/or interpreting pointers within a private address space that is a subset of an overall address space. This execution environment may not be a container or virtual machine. For purposes of description, this type of execution environment is sometimes referred herein as an isolated execution environment. In a specific implementation, the worker script is run in an isolate of the V8 JavaScript engine.

Because a single process can run multiple isolated execution environments, the overhead of running the isolated execution environments is occurred once (e.g., starting the single process to run the isolated execution environments) and isolated execution environments can be started and run with very little individual overhead. The worker scripts may not be executed using a virtual machine or a container. Unlike other cloud computing platforms that spin up a containerized process for processing code that can take as much as ten seconds, an isolated execution environment can be started in as little as 5 ms because a new process does not need to be started (assuming the single process that runs the isolated execution environments is started). Also, since the worker scripts can be run in a single process, there are no expensive context switches like experienced with other cloud computing platforms which means that more time is spent running the code instead of performing context switches. Also, because the implementations of the single process are shared between all isolated execution environments, the memory requirements are less than traditional cloud computing platforms.

In an embodiment, a particular worker script is loaded and executed on-demand (when and only if it is needed) at a particular compute server of the distributed cloud computing network. Each request for a domain that triggers handling of a worker script will be handed by the worker at the compute server that is closest to the requesting user. For instance, when responding to a user in New Zealand, a worker script is run in a compute server in New Zealand that is closest to the user. The compute server that receives the request may be determined by the network infrastructure according to an Anycast implementation or by a geographical load balancer.

In an embodiment, the distributed data store includes a key-value store that is available at each of the PoPs and is eventually-consistent. Eventual consistency means that eventually all accesses to an item will return the last updated value. However, if two clients write different values to the same key at approximately the same time, the last client to write eventually "wins" and its value becomes globally consistent. If a client writes to a key and that same client reads that key, the values may be inconsistent for a short amount of time. The key-value store may store data of a customer including state information (e.g., access tokens, translation data, feature flags, shopping cart data, etc.) and/or site assets (e.g., (e.g., HTML, image(s), video(s), CSS, script(s) (e.g., JavaScript), audio, etc.). The distributed data store may be included in a central storage (e.g., a cloud storage) and available in cache in at least some of the compute servers. For instance, data of the key-value store may be cached at a particular PoP or compute server at first read or write of the data at that particular PoP or compute server. In such an embodiment, the data may be stored in central storage (the data may be encrypted) and an API may be used to read and write the data through a cache on a compute server.

As described above, entire applications or websites can run entirely on the distributed cloud computing network even without an origin server. Since the compute servers are located on the edge of the network and therefore closer to the clients than an origin server, the website or application can be delivered to the clients with reduced latency (the website or application does not need to be fetched from the origin server).

Figure 1:
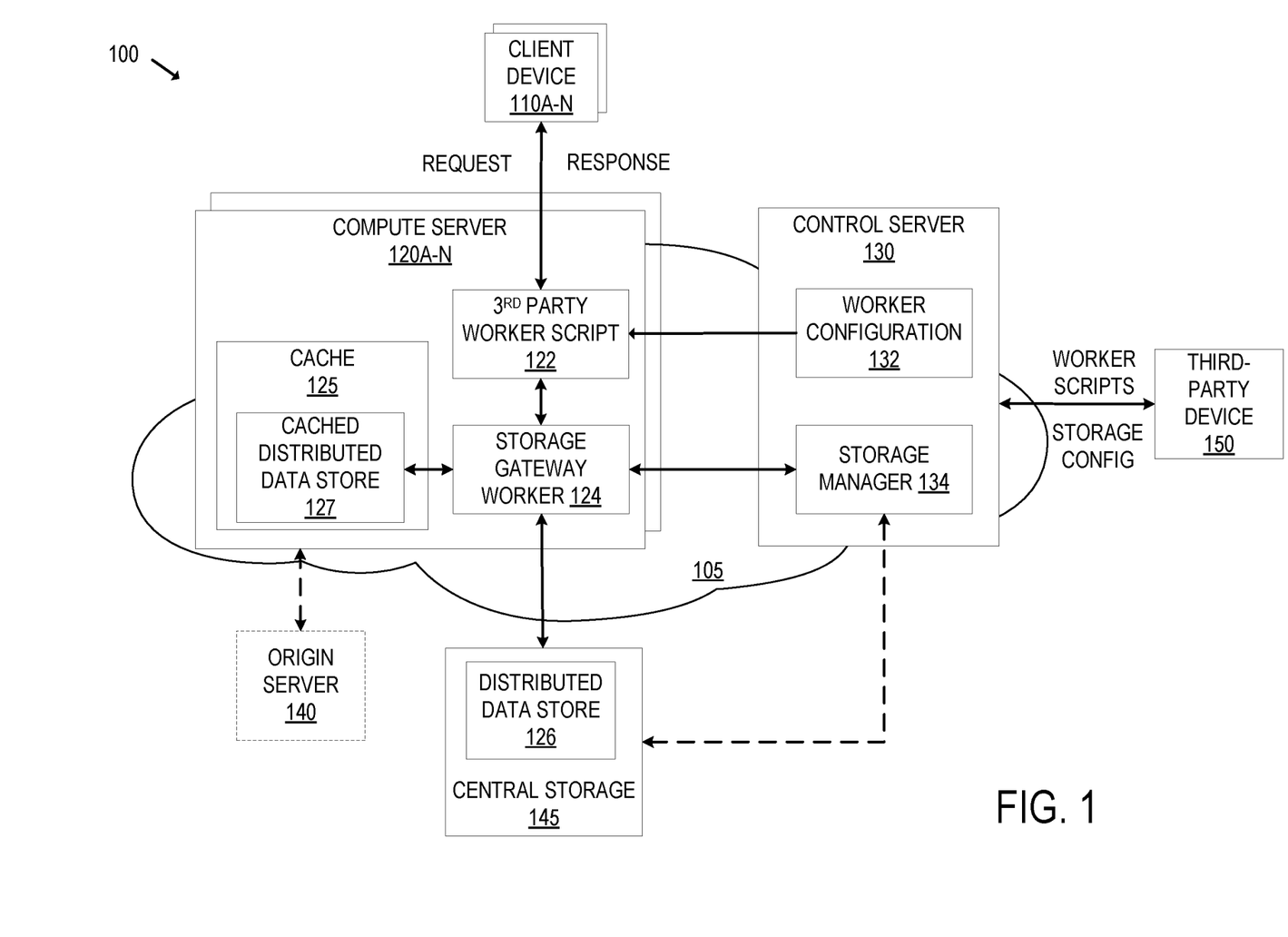
FIG. 1 illustrates an exemplary embodiment for a cloud computing platform that executes third-party code and provides a distributed data store in a distributed cloud computing network according to an embodiment.

FIG. 1 illustrates an exemplary embodiment for a cloud computing platform that executes third-party code and provides a distributed data store (e.g., key value store) in a distributed cloud computing network according to an embodiment. The system 100 includes the client devices 110A-N, the compute servers 120A-N, the control server 130, the origin server 140 (which is optional), the central storage 145, and the third-party device 150.

Each client device 110 is a computing device (e.g., laptop, workstation, smartphone, mobile phone, tablet, gaming system, set top box, wearable device, Internet of Things (IoT) device, etc.) that is capable of transmitting and/or receiving network traffic. Each client device may execute a client network application such as a web browser, native application, or other application that can access network resources (e.g., web pages, images, word processing documents, PDF files, movie files, music files, or other computer files). Each client device 110 is capable of indirectly reading and/or writing to the distributed data store 126.

The third-party device 150 is a computing device (e.g., laptop, workstation, smartphone, mobile phone, tablet, etc.) that is used by third parties such as a customer to, among other things, interact with the control server 130. For instance, a customer may access the control server 130 to configure code to run in the cloud computing platform and/or configure storage for their application.

The compute servers 120A-N are part of the distributed cloud computing network 105. The compute servers 120A-N are geographically distributed (e.g., in different locations throughout the world). There may be hundreds or more compute servers 120. Each compute server 120 may include one or more physical servers that are part of the same PoP. Although not illustrated in FIG. 1, the compute servers 120A-N may be part of PoPs that may include other physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP (and each compute server) may be part of a different data center and/or colocation site. Although not illustrated in FIG. 1, there are other physical devices between the compute servers 120A-N such as routers, switches, etc.

Since the compute servers 120A-N are geographically distributed, the distance between requesting client devices and the compute servers is decreased, which decreases the time necessary to respond to a request. The compute servers 120A-N may operate as a reverse proxy and receive requests for network resources (e.g., HTTP/S requests) of a domain of a customer. The particular compute server 120 that receives a request from a client device may be determined by the network infrastructure according to an Anycast implementation or by a geographical load balancer. For instance, the compute servers 120A-N may have a same anycast IP address for a domain of the customer. If the domain is "example.com", a DNS request for "example.com" returns an address record having the anycast IP address of the compute servers 120A-N. Which one of the compute servers 120A-N receives a request from a client device depends on which compute server 120 is closest to the client device in terms of routing protocol configuration (e.g., Border Gateway Protocol (BGP) configuration) according to an anycast implementation as determined by the network infrastructure (e.g., router(s), switch(es), and/or other network equipment between the requesting client and the compute servers 120A-N. In some embodiments, instead of using an anycast mechanism, a geographical load balancer is used to route traffic to the nearest compute server. The number of client devices and compute servers illustrated in FIG. 1 is exemplary. The distributed cloud computing network 105 may include hundreds to thousands (or more) compute servers and each compute server may receive requests from thousands or more client devices.

In the example of FIG. 1, each of the compute servers 120A-N can execute the worker script(s) of a third-party. Thus, as illustrated in FIG. 1, the compute servers 120A-N include the third-party worker script 122. In an embodiment, each worker script is run in an isolated execution environment, such as run in an isolate of the V8 JavaScript engine. The worker scripts are run within a single process in an embodiment. This single process can contain multiple execution environments at the same time and the process can seamlessly switch between them. Code in one execution environment cannot interfere with code running in a different execution environment despite being in the same process. The execution environments are managed in user-space rather than by an operating system. Each execution environment uses its own mechanism to ensure safe memory access, such as preventing the code from requesting access to arbitrary memory (restricting its use to the objects it has been given) and/or interpreting pointers within a private address space that is a subset of an overall address space. The worker scripts are not executed using a virtual machine or a container. In an embodiment, a particular worker script is loaded and executed on-demand (when and only if it is needed) at a particular compute server of the distributed cloud computing network. Each request for a domain that triggers handling of a worker script will be handed by the worker at the compute server that is closest to the requesting user.

The distributed data store 126 is stored in the central storage 145. The central storage 145 may be a cloud storage that is accessible by each of the compute servers 120A-N. Although FIG. 1 illustrates a single central storage 145, there may be multiple central storages that are geographically located in different locations and are synchronized. In an embodiment, the distributed data store 126 is a key-value store. The key-value store may be eventually-consistent. The key-value store may be separated into different namespaces for different customers. A namespace is a container for key-value pairs. One or more namespaces may be created for each customer (e.g., created by or for the customer). Each namespace can store many key-value pairs (e.g., up to a billion or more key-value pairs). The values can be any arbitrary byte sequences but are typically strings or blobs. By way of example, the key-value store may store data of a customer including state information (e.g., access tokens, translation data, feature flags, shopping cart data, etc.) and/or site assets (e.g., HTML, image(s), video(s), CSS, script(s) (e.g., JavaScript), audio, etc.). The values can be written using an API or written from a third-party worker script 122.

In addition to, or in lieu of the distributed data store 126 being stored in the central storage 145, a cached distributed data store 127 may be stored on each of the compute servers 120A-N or at least some of the compute servers 120A-N (e.g., one or more compute servers of each PoP). The cached distributed data store 127 may be a proper subset of the distributed data store 126. The content of the cached distributed data store 127 may be different on different ones of the compute servers 120A-N. For instance, the cached distributed data store 127 on a particular compute server may be built from the distributed data store 126 as requests for data are received. It is possible for a cached distributed data store 127 on a first compute server having data of a customer and a cached distributed data store 127 on a second compute server having no data for that customer or different data for that customer. Each key-value pair in the cached distributed data store 127 may have a time to live (TTL) value where upon expiration that key-value pair is subject to removal from the cache. As a result, values that are read infrequently may be stored centrally in the distributed data store 126 while values that are read frequently at a particular PoP or compute server may be accessible in the cached distributed data store 127. Different types of values may have different TTLs. For instance, static assets (those assets that are written once and infrequently changed) may be stored in the cached distributed data store 127 indefinitely whereas dynamic assets (those assets that may frequently change) may have a shorter TTL value in the cached distributed data store 127. The caching in the compute servers 120A-N occurs in multiple locations throughout the world. This allows the most frequently accessed content on a site is cached in a location closest to the requesting clients, thereby reducing latency.

A third-party worker script 122 may access the distributed data store 126 and/or the cached distributed data store 127. For instance, a third-party worker script 122 may use the storage gateway worker 124 to write to and/or read from the distributed data store 126 and/or cached distributed data store 127. The storage gateway worker 124 is a worker (e.g., a system worker that is not a third-party worker) that proxies read and write requests to the distributed data store 126 on the central storage 145. The storage gateway worker 124 may expose an API for use by the third-party worker script 122 in reading, writing, and/or deleting data in the distributed data store 126. For instance, the API may include a read value method, a write value method, and a delete value method for respectively reading, writing, and deleting data within a particular namespace. By way of example, the read value method may take the form of "namespace.get(key, [type])", where type can be any of "text", "json", "arraybuffer", or "stream". The read value method returns a "promise" that can be "awaited" to get the value. If the key is not found, the "promise" revolves with a null value. By way of example, the write value method may take the form of "namespace.put(key, value)" where the type is automatically inferred from the value and can be any of string, readablestream, and arraybuffer. By way of example, the delete value method may take the form of "namespace.delete (key)".

The storage gateway worker 124 may also access the cached distributed data store 127 located in the cache 125 to determine if the requested data is cached. If the requested data is validly cached, the storage gateway worker 124 can respond to the third-party worker script 122 with the cached data instead of making a request to the distributed data store 126 included in the central storage 145. If the requested data is not validly cached in the cache 125, the storage gateway worker 124 transmits the read request to the distributed data store 126. Writes to the storage gateway worker 124 for data that exists in the cached distributed data store effectively results in a cache purge for that data.

The control server 130 is operated by the cloud computing platform and provides a set of tools and interfaces for a customer (e.g., internet application owner or operator, domain owner or operator) to, among other things, configure code to run in the cloud computing platform and/or configure storage for their application. For instance, the control server 130 includes the worker configuration 132 and the storage manager 134. The worker configuration 132 allows customers to configure code such as third-party scripts to be executed in the cloud computing platform. For instance, the worker configuration 132 may allow the customer to upload one or more worker scripts and may allow the customer to specify when the worker script(s) are to be run. For instance, the customer may associate a rule that indicates when a worker script is to be run. By way of example, the control server 130 may allow the customer to configure a URL matching pattern that indicates the URL(s) for which the worker script is to run. The control server 130 may allow the customer to delete and update previously uploaded worker script(s).

The storage manager 134 allows customers to configure storage for their application in the cloud computing platform. For instance, the storage manager 134 allows a customer to create and manage a namespace (e.g., a collection of key-value pairs), write data to the distributed data store 126 (e.g., write one or more key-value pairs), read data from the distributed data store 126 (e.g., read one or more key-value pairs), remove data from the distributed data store 126 (e.g., delete one or more key-value pairs), and/or list the keys in the namespace. In an embodiment, the storage manager 134 provides an interface (e.g., a command line interface) that allows a customer to upload one or more assets into the distributed data store 126 (e.g., HTML, image(s), video(s), CSS, script(s) (e.g., JavaScript), audio, etc.).

For instance, in an embodiment, the storage manager 134 provides an interface that allows a customer to specify the asset(s) to be included in the distributed data store 126 and/or one or more paths of asset(s) to be included in the distributed data store 126. These asset(s) may be static assets and include HTML, image(s), video(s), CSS, script(s), audio, or other asset types. The storage manager 134 may create an asset manifest that maps the filenames of the assets to a hash of their content. The asset manifest is used to map requests for a particular asset to the content hash of the most recently uploaded asset. This is used when caching the assets in the cached distributed data store 127. The storage manager 134 may cause the asset(s) to be pushed to the distributed data store 126 in the central storage and cause the asset manifest to be pushed to the distributed data store 126 and/or to each compute server 120A-N. By way of example, if the distributed data store 126 is a key-value store, the storage manager 134 may retrieve the asset(s) and upload the asset(s) to the distributed data store 126 where the key may be, for example, the name of the asset and/or the content hash, and the corresponding value may be the blob of the asset. When a request for the asset is received, the third-party worker script reads the request URI, determines the content hash of the requested asset (e.g., by accessing the asset manifest for that requested file), and retrieves the corresponding blob from the distributed data store 126 using the storage gateway worker 124. As an example, if the request is for "example.com/index.html", the third-party worker script 122 access the access manifest to determine the key and then retrieves the value (the blob of "index .html") from the distributed data store 126 using the determined key. The mime-type of the requested asset may also be determined, and the appropriate headers may be generated (e.g., content-type, cache-control).

The storage manager 134 may provide an interface that allows a customer to update an asset included in the distributed data store 126. The interface may allow the customer to specify the asset(s) to be updated in the distributed data store 126 and/or one or more paths of asset(s) to be updated in the distributed data store 126. The storage manager 134 may create an updated manifest that maps the filename and a content hash representing the new content of the asset that is distributed to the distributed data store 126 and/or to each compute server 120A-N. When a request for the updated asset is received, the third-party worker script reads the request URL, determines the new content hash of the requested asset (e.g., by accessing the updated asset manifest for that requested file), and retrieves the corresponding blob from the distributed data store 126 using the storage gateway worker 124.

Conventional static site solutions use a site's HTML as an entry point to the static site generator's asset manifest. This causes problems in caching HTML because it is difficult or impossible to bust the cache because there is no other entry point to manage the asset fingerprints other than the HTML itself. However, in embodiments described herein, the third-party code piece is the entry point to the asset manifest. This allows the HTML to be cached because if the HTML is updated, an updated content hash for the HTML is generated and used in the updated asset-manifest file. Thus, the updated content hash can be used for cache busting while at the same time having cacheable HTML.

The storage gateway worker 124 also may generate the appropriate headers for a response. For instance, the storage gateway worker 124 may detect the content-type for the response based on the file extension in the request and may specify the cache-control header for specifying caching directives.

The origin server 140, which may be owned or operated directly or indirectly by a customer of the cloud computing platform, is a computing device on which a network resource resides and/or originates (e.g., web pages, images, word processing documents, PDF files movie files, music files, or other computer files). In an embodiment, the origin server 140 is not required such that a compute server can respond to a request without querying an origin server.

Figure 2:
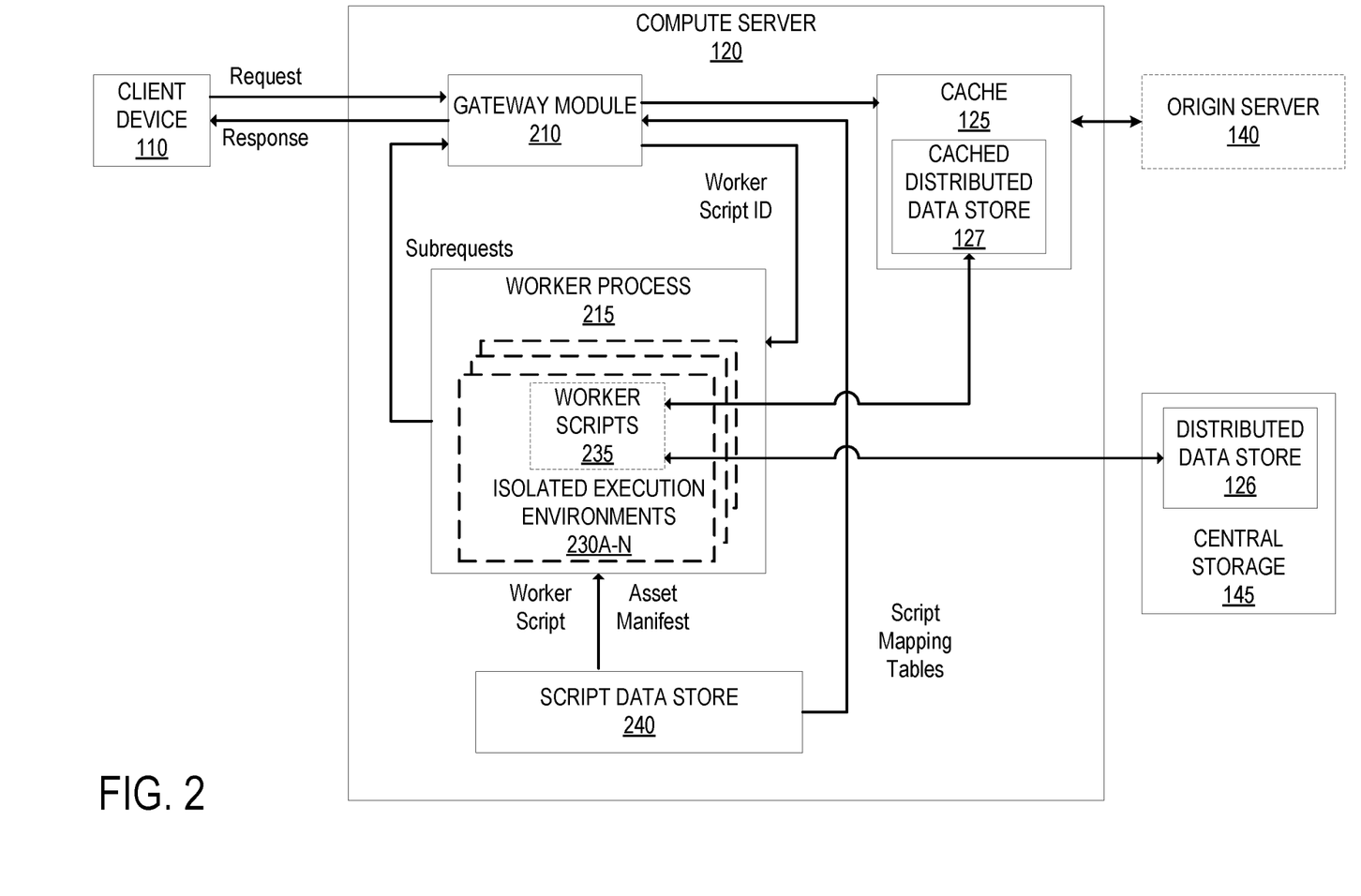
FIG. 2 illustrates an example of a compute server according to an embodiment.

FIG. 2 illustrates an example of a compute server 120 according to an embodiment. The compute server 120 includes a gateway module 210, a worker process 215, the cache 125, and a script data store 240. The gateway module 210 receives web requests and processes web responses (e.g., HTTP requests and HTTP responses). The gateway module 210 may be acting as a reverse proxy for a domain of a customer. The gateway module 210 has access to the cache 125 that is configured to cache network resources (e.g., web pages, images, word processing documents, PDF files movie files, music files, or other computer files), configuration files, scripts, and/or other computer files. The script data store 240 is configured to store, among other items, the worker scripts that are received from the control server 130, the URL matching pattern rule that indicates the URL(s) for which the worker script is to run, a worker script mapping that maps worker script identifiers to URL matching patterns, and/or an asset manifest.

The worker process 215 is a single process that executes the isolated execution environments 230A-N. There may be hundreds to thousands of isolated execution environments that are run simultaneously by the worker process 215. In an embodiment, each different third-party worker script 122 is run by a different one of the isolated execution environments 230A-N each with its own heap. As illustrated in FIG. 2, the isolated execution environments 230A-N execute the worker scripts 235 that may include the third-party worker script 122 and/or the storage gateway worker 124. The worker process 215 starts an isolated execution environment to load a particular worker script on the first use of the worker script. Depending on the complexity of the worker script, loading the worker script may take approximately ten to hundreds of milliseconds of CPU time. A worker script says loaded in memory between requests so that the worker script can be used to respond quickly when a new request that triggers that worker script arrives. Handling a single request for a worker script that is already loaded typically takes a fraction of a millisecond of CPU time depending on the complexity of the worker script. In an embodiment, one isolated execution environment is created per unique worker script identifier. Thus, if many zones use identical worker scripts, memory is saved by compiling the script only once. The worker process 215 evicts worker scripts (e.g., in a least recently used fashion). The worker process 215 may be started during booting of the compute server 120 or when the first worker script is triggered for execution.

The gateway module 210 receives a request from the client device 110. The request may be an HTTP/S request for a zone of the customer. The gateway module 210 processes the request including determining whether the request triggers executing of a worker script. For instance, the gateway module 210 analyzes the request URL against the URL matching pattern configured for the zone to determine if a worker script is to be executed. If a worker script is to be executed, the gateway module 210 annotates the request with the identifier of the worker script to be executed as determined by the script mapping table and forwards the request to the worker process 215. If the identified worker script is already loaded (if there is already an isolated execution environment running an instance of the worker script), the worker process 215 does not need to load another instance of the worker script. However, if the identified worker script that is already loaded is from a different zone (which is probably from a different customer), the worker process 215 creates a separate context (a global object) for the worker script so that each zone has its own isolated global state. That prevents zones from interfering with the state of other zones. The gateway module 210 generates the response after the worker script(s) are executed. If the identified worker script is not loaded, the worker process 215 creates an isolated execution environment and loads and executes the worker script.

The executed worker script can take various actions depending on how the script is written. The worker script may make one or more further requests (referred herein as "subrequests") such as additional HTTP requests. These subrequests may be destined for the origin server 140 or to other destinations on the internet. The worker process 215 sends the subrequests back to the gateway module 210 for further processing. The gateway module 210 is configured to prevent the subrequest from looping back to the same worker script. But, the subrequest may trigger a different worker script potentially from a different zone. If the subrequest is to the same zone, the gateway module 210 may transmit the subrequest to the origin server 140 for processing and receives the response from the origin server 140. If the subrequest triggers a worker script, the gateway module 210 annotates the request with the identifier of the worker script to be executed as determined by the script mapping table and forwards the request to the worker process 215 for executing the script.

Thus, a single request can trigger multiple worker scripts, even from different zones from different customers, to be run. Since the worker scripts are run on the same physical compute server, network latency to execute these scripts reduces to zero. Further, there is savings in bandwidth because the different origin zones may not need to be contacted. To provide an example, say a customer has a service where a user can make a purchase by an SMS message. The user sends an SMS message to make the purchase where the SMS message is handled by an API of a first third-party provider that generates an event to a function. That function invokes a payment API of a second third-party provider to charge the user's credit card, which generates an invoice event that is handled by a function to email the invoice to the user. Each of these transactions involve potentially crossing the internet, incurring latency and bandwidth charges. In contrast, with embodiments described herein, the API of the first third-party provider and the API of the second third-party provider can be implemented as worker scripts and executed on the same physical compute server, reducing latency and bandwidth.

The worker scripts can perform many different actions. By way of example, the worker scripts may perform one or more of the following: intercept and modify HTTP request and response URLs, status, headers, and body content; respond to requests directly from the worker script or forward the request elsewhere; send HTTP requests to third-party servers; send multiple requests, in serial or in parallel, and use the responses to compose a final response to the original request; send asynchronous requests after the response has already been returned to the client (for example, for logging or analytics); read data from a distributed data store, write data to a distributed data store, delete data from a distributed data store, and control behavior such as caching behavior. A customer may perform one or more of these actions to do the following, for example: perform A/B testing between two different back-ends; build "serverless" applications that rely entirely on web APIs; create custom security filters to block unwanted traffic; rewrite requests to improve cache hit rate; implement custom load balancing and failover logic; collecting analytics without running code in the user's browser, and/or serve entire applications or websites from the compute servers without use of an origin server. Of course, these are just examples and the worker scripts can be used to perform other actions.

Figure 3:
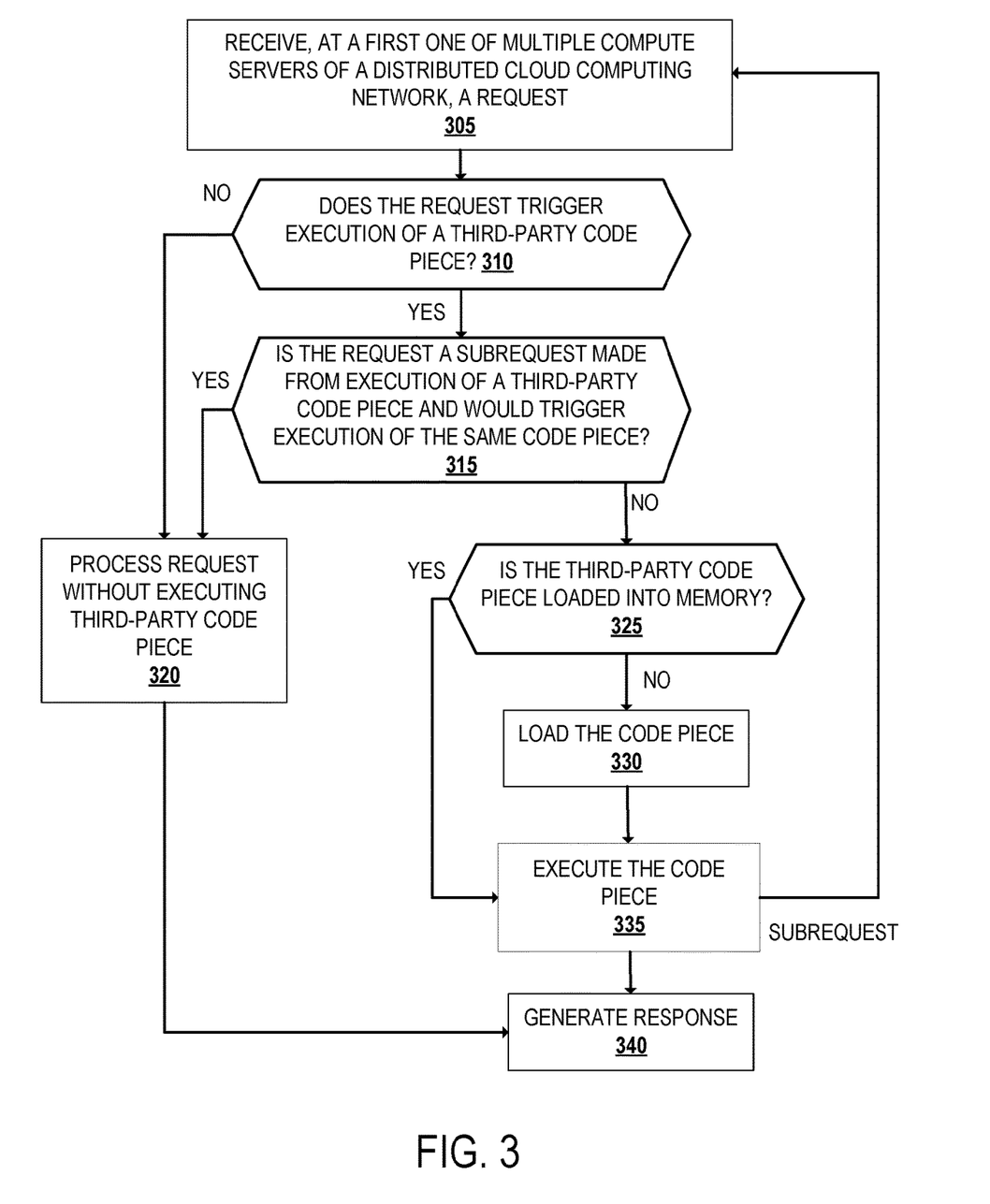
FIG. 3 is a flow diagram that illustrates exemplary operations for executing third-party code in a distributed cloud computing network according to an embodiment.

FIG. 3 is a flow diagram that illustrates exemplary operations for executing third-party code in a distributed cloud computing network according to an embodiment. The operations of FIG. 3 are described with respect to the exemplary embodiment of FIG. 1. However, the operations of FIG. 3 can be performed by different embodiments than those of FIG. 1, and the embodiment described in FIG. 1 can perform operations different than those of FIG. 3. The operations of FIG. 3 will be described with respect to HTTP/S request and responses. But, the operations of FIG. 3 can be performed with different types of requests and responses.

At operation 305, a first one of multiple compute servers of a distributed cloud computing network receives a request. The request may be received from a client device and be an HTTP or HTTPS request. The request may be destined for a zone. In an embodiment, the compute server receives the request out of the multiple compute servers because it has been determined to be the closest to the requesting client device as determined by an anycast implementation. Instead of the request being received from an external client device, the request could be received as a subrequest sent by a third-party code piece. If a subrequest, the subrequest may identify the third-party code piece that generated the subrequest (e.g., it may include the identifier of the third-party code piece).

The compute server that receives the request determines whether the request triggers execution of a third-party code piece at operation 310. This determination may include matching the zone to a predetermined matching pattern that associates the third-party code piece to the predetermined matching pattern. For instance, the request URL may be compared to a URL matching pattern configured for the zone to determine if a third-party code piece is to be executed and if so, which third-party code piece. If the request does not trigger execution of a third-party code piece, then operations move to operation 320. If the request triggers execution of a third-party code piece, then operations move to operation 315.

The compute server is configured to prevent a subrequest from looping back to the same third-party code piece. Thus, at operation 315, the compute server determines if the request is from a subrequest made from execution of a third-party code piece and would trigger execution of the same third-party code piece. For example, the compute server determines whether the request identifies the third-party code piece as generating the request and determines whether the request triggers execution of the same third-party code piece using the predetermined matching pattern. If the request is a subrequest and would trigger execution of the same third-party code piece, then flow moves to operation 320. Otherwise, flow moves to operation 325.

At operation 320, the request is processed without executing a third-party code piece. The request may be processed differently depending on the destination of the request and the requester. For instance, if the request is for a web page from a client device, the web page and/or the resource(s) of the web page may be accessed from the cache 125 (if available) and/or from the origin server 140 of the domain of the web page. If the request is from a third-party code piece (a subrequest), the request is processed and response and returns the data to the third-party code piece for further processing. After processing the request, flow moves to operation 340 for generating the response.

In an embodiment, third-party code pieces stay loaded in memory between requests so that they can be used to respond quickly when a new request that triggers the third-party code piece arrives. A third-party code piece may be run separately per zone. Each different zone running the same third-party code piece may be put in a separate context (have their own global object) within the same isolated execution environment running that third-party code piece so each zone as its own isolated global state. This prevents two different zones from interfering with the states of each other while allowing the contexts to share resources. At operation 325, the compute server determines whether the third-party code piece is loaded into memory. If the third-party code piece is loaded (e.g., if there is already an isolated execution environment running for the third-party code piece for the zone), the third-party code piece is executed in operation 335. If the third-party code piece is not loaded, then at operation 330 the third-party code piece is loaded and then the third-party code piece is executed in operation 335.

The executed third-party code piece can take various actions depending on how the code is written. The third-party code piece may make one or more subrequests that can be destined for an origin server 140 of the zone of the third-party code piece or to other destinations on the internet. As illustrated in FIG. 3, if executing the code piece at operation 335 causes a subrequest to be generated, operation moves back to operation 305. The subrequest identifies the third-party code piece that generated the subrequest. The result of the subrequest may be processed by the code piece.

The third-party code piece may read, write, and/or delete one or more values from the distributed data store 126. For instance, the third-party code piece may use an API provided by the storage gateway worker 124 to read a value from the distributed data store 126. For instance, the third-party code piece may call a read value method that takes the form of "namespace.get(key,[type])" for a given namespace. In the case of a static asset, the third-party code piece determines the content hash of the requested asset by looking up that asset in the asset manifest. It can then use the filename and/or content hash of the asset as the key when fetching the content of the requested asset (e.g., a blob of the requested asset) from the distributed data store 126. The storage gateway worker 124 processes the call including determining whether the value is validly cached in the cached distributed data store 127. If the value is not available in the cached distributed data store 127, the storage gateway worker 124 accesses the distributed data store 126 in the central storage 145 for the value. The storage gateway worker 124 may also cache the value in the cached distributed data store 127. In the case of a static asset, the storage gateway worker 124 may insert the value into the cached distributed data store 127 keyed by the filename and/or content hash.

The third-party code piece may write a value to the distributed data store 126. For instance, the third-party code piece may use an API provided by the storage gateway worker 124 to write a value to the distributed data store 126. By way of example, the write value method may take the form of "namespace.put(key, value)" where the type is automatically inferred from the value and can be any of string, readablestream, and arraybuffer (for example). The storage gateway worker 124 may insert the value to the cached distributed data store 127 (e.g., insert the key-value pair in the cached distributed data store 127) and insert the value to the distributed data store 126 (e.g., insert the key-value pair in the distributed data store 126). If a key for the value already exists, the write value method essentially results in a cache purge on each compute server 120A-N for the existing value. After writing the value to the cached distributed data store 127, that value is locally available for subsequent reads at the compute server that performed the write and/or the PoP to which the compute server belongs, and other compute servers need to access the value from the distributed data store 126.

The third-party code piece may delete a value from the distributed data store 126. For example, the third-party code piece may use an API provided by the storage gateway worker 124 to delete a value from the distributed data store 126. By way of example, the delete value method may take the form of "namespace.delete(key)". The storage gateway worker 124 may delete the key and/or value from the cached distributed data store 127 and the distributed data store 126.

At operation 340, a response is generated. The response may be an HTTP response, for example. If a third-party code piece was executed, the content of the response depends on the execution of that third-party code piece. By way of example, the storage gateway worker 124 may generate the appropriate headers for the response. For instance, the storage gateway worker 124 may detect the content-type for the response based on the file extension in the request and may specify the cache-control header for specifying caching directives. The response is sent to the requesting client.

Figure 4:
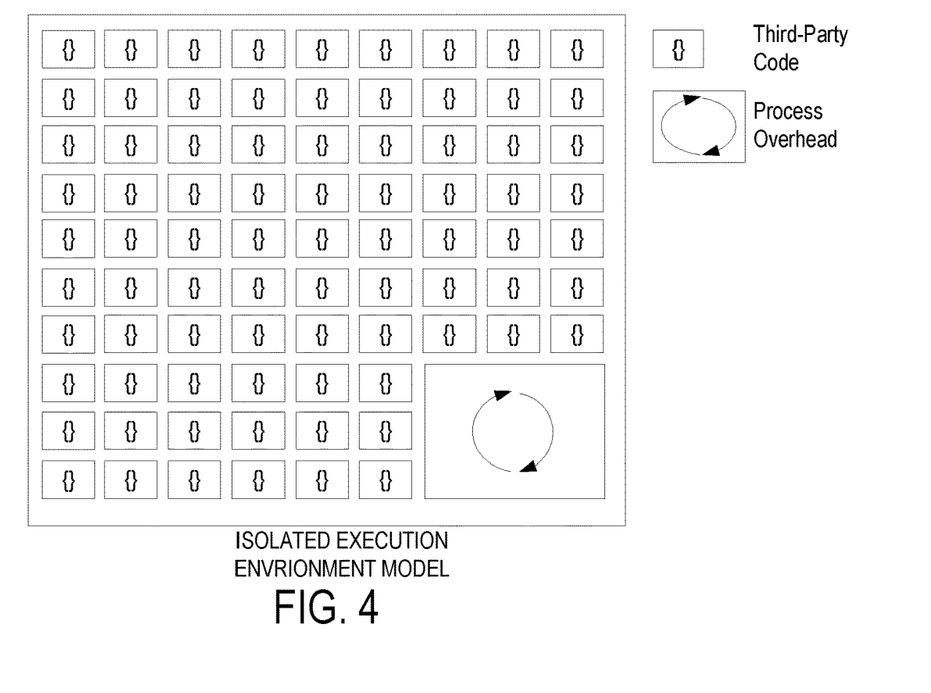
FIG. 4 is a conceptual figure that shows a conceptual relationship between third-party code and the process overhead of the isolated execution environment model that is described in embodiments.
Figure 5:
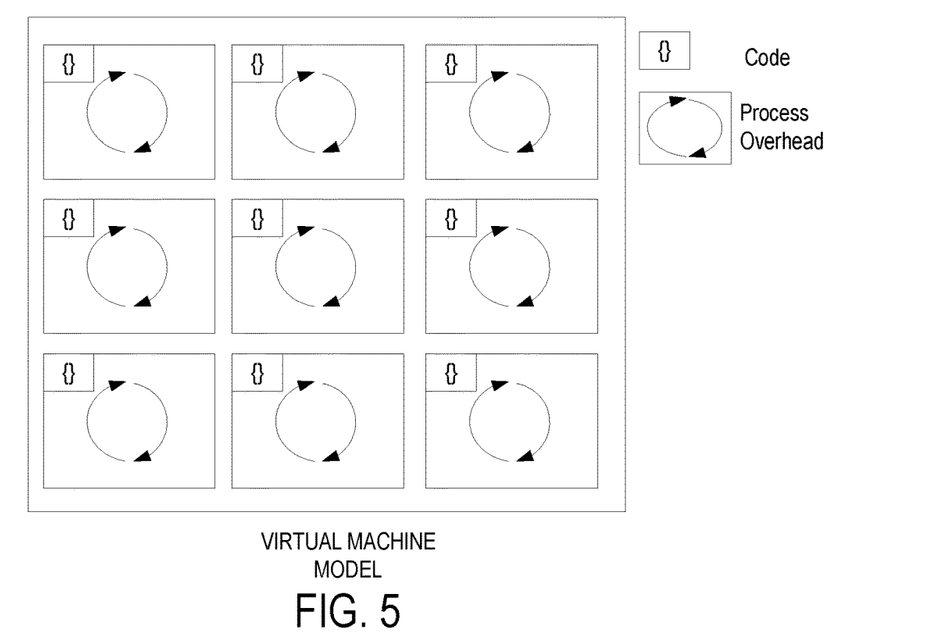
FIG. 5 is a conceptual figure that shows a conceptual relationship between code and the process overhead of a virtual machine model.

Running third-party code pieces in isolated execution environments improves the performance as compared with running code using a virtual machine or a container. Unlike other computing platforms that spin up a containerized process for processing code that can take as much as ten seconds, an isolated execution environment can be started in as little as 5 ms because a new process does not need to be started. Thus, the overhead of running an isolated execution environment is small as compared to other computing platforms. Further, since the third-party code can be run in a single process, there are no expensive context switches like experienced with other computing platforms which means that more time is spent actually running the code instead of performing context switches. FIG. 4 is a conceptual figure that shows a conceptual relationship between third-party code and the process overhead of the isolated execution environment model that is described in embodiments herein. FIG. 5 is a conceptual figure that shows a conceptual relationship between code and the process overhead of a virtual machine model. As seen in FIGS. 4 and 5, the process overhead of the virtual machine model is experienced for each different code piece (a new process has to be started for each different code piece), whereas the process overhead of the isolated execution environment model is experienced once.

Figure 6:
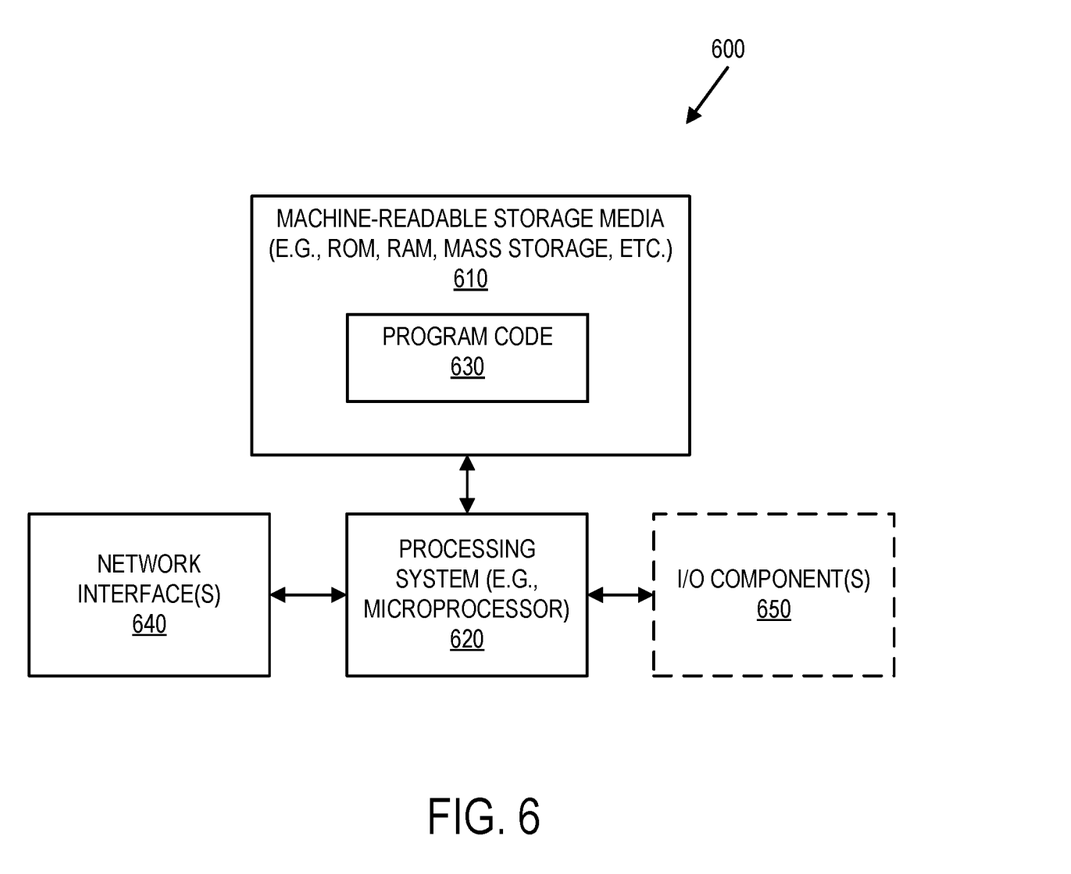
FIG. 6 illustrates a block diagram for an exemplary data processing system that may be used in some embodiments.

FIG. 6 illustrates a block diagram for an exemplary data processing system 600 that may be used in some embodiments. One or more such data processing systems 600 may be utilized to implement the embodiments and operations described with respect to the compute servers, control server, and/or client devices.

The data processing system 600 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 620. The processing system 620 may be one or more processors and/or connected system components such as multiple connected chips. The depicted machine-readable storage media 610 may store program code 630 that, when executed by the processor(s) 620, causes the data processing system 600 to perform the operations described herein.

The data processing system 600 also includes one or more network interfaces 640 (e.g., a wired and/or wireless interfaces) that allows the data processing system 600 to transmit data and receive data from other computing devices, typically across one or more networks (e.g., Local Area Networks (LANs), the Internet, etc.). The data processing system 600 may also include one or more input or output ("I/O") components 650 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 600, and, in certain embodiments, fewer components than that shown may be part of the system 600.

The techniques shown in the figures can be implemented using code and data stored and executed on one or more computing devices (e.g., client device, compute server, DNS server, control server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving, at a first one of a plurality of compute servers from a first client device, a first request that triggers execution of a first one of a plurality of third-party code pieces, wherein the first compute server is one of the plurality of compute servers that are part of a distributed cloud computing network, wherein the first one of the plurality of third-party code pieces is configured to, when executed, retrieve at least one value from a distributed key-value store;
   executing the first one of the plurality of third-party code pieces, wherein executing the first one of the plurality of third-party code pieces includes retrieving at least one value from the distributed key-value store, wherein retrieving the at least one value from the distributed key-value store includes performing the following:
      determining that the value is not available in a cached distributed key-value store for the first one of the plurality of compute servers, and responsive to this determination,
         retrieving the value from the distributed key-value store located in a central storage, and
         inserting the retrieved value into the cached distributed key-value store;
   generating a response to the first request based at least in part on the executed first one of the plurality of third-party code pieces; and
   transmitting the generated response to the first client device.

2. The method of claim 1, wherein the first one of the plurality of third-party code pieces is executed by a single process at the first one of the plurality of compute servers, wherein the first one of the plurality of third-party code pieces is run in a first one of a plurality of isolated execution environments, and wherein each of the other plurality of third-party code pieces are run in the other plurality of isolated execution environments respectively and executed by the single process.

3. The method of claim 1, further comprising:
   receiving, at the first one of a plurality of compute servers from a second client device, a second request that triggers execution of a second one of a plurality of third-party code pieces, wherein the second one of the plurality of third-party code pieces is configured to, when executed, write at least one value from a distributed key-value store;
   executing the second one of the plurality of third-party code pieces, wherein executing the second one of the plurality of third-party code pieces including writing at least one value to the distributed key-value store, wherein writing the at least one value to the distributed key-value store includes performing the following:
      writing the value to the cached distributed key-value store, and
      writing the value to the distributed key-value store located in the central storage;
   generating a response to the second request based at least in part on the executed second one of the plurality of third-party code pieces; and
   transmitting the generated response to the second client device.

4. The method of claim 1, further comprising:
wherein a set of one or more static assets of a web site are cached in the cached distributed key-value store,
receiving, at the first one of a plurality of compute servers from a third client device, a third request that triggers execution of a third one of a plurality of third-party code pieces;
executing the third one of the plurality of third-party code pieces including performing the following:
retrieving the at least one of the set of one or more static assets of the website from the cached distributed key-value store without accessing an origin server for the at least one of the set of one or more static assets of the website;
causing a response to be generated to the third request including determining one or more headers for the request; and
transmitting the generated response to the third client device that includes the retrieved at least one of the set of one or more static assets of the website.

5. The method of claim 1, wherein each of the plurality of compute servers are anycasted to a same IP address, and wherein the first one of the plurality of compute servers receives the request because it is closest one of the plurality of compute servers to the client device as determined by an anycast implementation.

6. The method of claim 1, wherein the plurality of third-party code pieces are provided by one or more operators or owners of a domain.

7. A non-transitory machine-readable storage medium that provides instructions that, when executed by a processor, causes said processor to perform the following operations:
receiving, at a first one of a plurality of compute servers from a first client device, a first request that triggers execution of a first one of a plurality of third-party code pieces, wherein the first compute server is one of the plurality of compute servers that are part of a distributed cloud computing network, wherein the first one of the plurality of third-party code pieces is configured to, when executed, retrieve at least one value from a distributed key-value store;
executing the first one of the plurality of third-party code pieces, wherein executing the first one of the plurality of third-party code pieces includes retrieving at least one value from the distributed key-value store, wherein retrieving the at least one value from the distributed key-value store includes performing the following:
determining that the value is not available in a cached distributed key-value store for the first one of the plurality of compute servers, and responsive to this determination,
retrieving the value from the distributed key-value store located in a central storage, and
inserting the retrieved value into the cached distributed key-value store;
generating a response to the first request based at least in part on the executed first one of the plurality of third-party code pieces; and
transmitting the generated response to the first client device.

8. The non-transitory machine-readable storage medium of claim 7, wherein the first one of the plurality of third-party code pieces is executed by a single process at the first one of the plurality of compute servers, wherein the first one of the plurality of third-party code pieces is run in a first one of a plurality of isolated execution environments, and wherein each of the other plurality of third-party code pieces are run in the other plurality of isolated execution environments respectively and executed by the single process.

9. The non-transitory machine-readable storage medium of claim 7, wherein the operations further comprise:
receiving, at the first one of a plurality of compute servers from a second client device, a second request that triggers execution of a second one of a plurality of third-party code pieces, wherein the second one of the plurality of third-party code pieces is configured to, when executed, write at least one value from a distributed key-value store;
executing the second one of the plurality of third-party code pieces, wherein executing the second one of the plurality of third-party code pieces including writing at least one value to the distributed key-value store, wherein writing the at least one value to the distributed key-value store includes performing the following:
writing the value to the cached distributed key-value store, and
writing the value to the distributed key-value store located in the central storage;
generating a response to the second request based at least in part on the executed second one of the plurality of third-party code pieces; and
transmitting the generated response to the second client device.

10. The non-transitory machine-readable storage medium of claim 7, wherein the operations further comprise:
wherein a set of one or more static assets of a web site are cached in the cached distributed key-value store,
receiving, at the first one of a plurality of compute servers from a third client device, a third request that triggers execution of a third one of a plurality of third-party code pieces;
executing the third one of the plurality of third-party code pieces including performing the following:
retrieving the at least one of the set of one or more static assets of the website from the cached distributed key-value store without accessing an origin server for the at least one of the set of one or more static assets of the website;
causing a response to be generated to the third request including determining one or more headers for the request; and
transmitting the generated response to the third client device that includes the retrieved at least one of the set of one or more static assets of the website.

11. The non-transitory machine-readable storage medium of claim 7, wherein each of the plurality of compute servers are anycasted to a same IP address, and wherein the first one of the plurality of compute servers receives the request because it is closest one of the plurality of compute servers to the client device as determined by an anycast implementation.

12. The non-transitory machine-readable storage medium of claim 7, wherein the plurality of third-party code pieces are provided by one or more operators or owners of a domain.

13. An apparatus, comprising:
a processor; and
a non-transitory machine-readable storage medium that provides instructions that, if executed by the processor, will cause the processor to perform the following operations:
receiving, at a first one of a plurality of compute servers from a first client device, a first request that triggers execution of a first one of a plurality of third-party code pieces, wherein the first compute server is one of the plurality of compute servers that are part of a distributed cloud computing network, wherein the first one of the plurality of third-party code pieces is configured to, when executed, retrieve at least one value from a distributed key-value store;

executing the first one of the plurality of third-party code pieces, wherein executing the first one of the plurality of third-party code pieces includes retrieving at least one value from the distributed key-value store, wherein retrieving the at least one value from the distributed key-value store includes performing the following:

determining that the value is not available in a cached distributed key-value store for the first one of the plurality of compute servers, and responsive to this determination, retrieving the value from the distributed key-value store located in a central storage, and inserting the retrieved value into the cached distributed key-value store;

generating a response to the first request based at least in part on the executed first one of the plurality of third-party code pieces; and transmitting the generated response to the first client device.

14. The apparatus of claim 13, wherein the first one of the plurality of third-party code pieces is executed by a single process at the first one of the plurality of compute servers, wherein the first one of the plurality of third-party code pieces is run in a first one of a plurality of isolated execution environments, and wherein each of the other plurality of third-party code pieces are run in the other plurality of isolated execution environments respectively and executed by the single process.

15. The apparatus of claim 13, wherein the operations further comprise:

receiving, at the first one of a plurality of compute servers from a second client device, a second request that triggers execution of a second one of a plurality of third-party code pieces, wherein the second one of the plurality of third-party code pieces is configured to, when executed, write at least one value from a distributed key-value store;

executing the second one of the plurality of third-party code pieces, wherein executing the second one of the plurality of third-party code pieces including writing at least one value to the distributed key-value store, wherein writing the at least one value to the distributed key-value store includes performing the following:

writing the value to the cached distributed key-value store, and writing the value to the distributed key-value store located in the central storage;

generating a response to the second request based at least in part on the executed second one of the plurality of third-party code pieces; and transmitting the generated response to the second client device.

16. The apparatus of claim 13, wherein the operations further comprise:

wherein a set of one or more static assets of a web site are cached in the cached distributed key-value store, receiving, at the first one of a plurality of compute servers from a third client device, a third request that triggers execution of a third one of a plurality of third-party code pieces;

executing the third one of the plurality of third-party code pieces including performing the following:

retrieving the at least one of the set of one or more static assets of the website from the cached distributed key-value store without accessing an origin server for the at least one of the set of one or more static assets of the website;

causing a response to be generated to the third request including determining one or more headers for the request; and transmitting the generated response to the third client device that includes the retrieved at least one of the set of one or more static assets of the website.

17. The apparatus of claim 13, wherein each of the plurality of compute servers are anycasted to a same IP address, and wherein the first one of the plurality of compute servers receives the request because it is closest one of the plurality of compute servers to the client device as determined by an anycast implementation.

18. The apparatus of claim 13, wherein the plurality of third-party code pieces are provided by one or more operators or owners of a domain.

* * * * *